United States Patent
Sugita (10) Patent No.: US 9,457,863 B2
(45) Date of Patent: Oct. 4, 2016

(54) MOTORCYCLE FRAME STRUCTURE (71) Applicant: SUZUKI MOTOR CORPORATION, Hamamatsu-shi, Shizuoka (JP)

(72) Inventor: Hisayuki Sugita, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/926,766

(22) Filed: Oct. 29, 2015

(65) Prior Publication Data
US 2016/0144924 A1 May 26, 2016

(30) Foreign Application Priority Data
Nov. 21, 2014 (JP) .................................. 2014-236238

(51) Int. Cl.
B62K 11/04 (2006.01)
(52) U.S. Cl.
CPC ....................................... B62K 11/04 (2013.01)
(58) Field of Classification Search
CPC ................................ B60K 11/02; B60K 11/04
See application file for complete search history.

(56) References Cited

U.S. PATENT DOCUMENTS

| 7,726,382 | B2 | 6/2010 | Suzuki et al. | ................. 164/340 |
| 2007/0131377 | A1 | 6/2007 | Suzuki et al. | ................. 164/137 |
| 2007/0193805 | A1* | 8/2007 | Adachi | ................... B62K 11/04 180/219 |
| 2015/0014958 | A1* | 1/2015 | Hirayama | ............... B62K 11/04 280/281.1 |
| 2015/0367905 | A1* | 12/2015 | Yoshida | ................. B62K 11/04 180/219 |
| 2016/0023713 | A1* | 1/2016 | Kawata | .................... B62M 7/04 180/219 |

FOREIGN PATENT DOCUMENTS

| JP | 2003-170882 A | 6/2003 |
| JP | 2007-144500 A | 6/2007 |

* cited by examiner

*Primary Examiner* — Kevin Hurley
(74) *Attorney, Agent, or Firm* — Stein IP, LLC (57) ABSTRACT

There is provided a motorcycle frame structure including a head frame which extends rearward from a head pipe, and tank rails which are welded to the head frame and extends rearward. The head frame includes first bracket portions extending downward. The tank rails include second bracket portions extending downward. An engine is suspended by the first bracket portions and the second bracket portions. Each of the first bracket portions includes a front wall portion extending in a width direction of a motorcycle, and a pair of side wall portions extending rearward from both ends of the front wall portion so as to form a first space opened to a rear side.

4 Claims, 6 Drawing Sheets

MOTORCYCLE FRAME STRUCTURE

CROSS-REFERENCE TO RELATED APPLICATIONS

The disclosure of Japanese Patent Application No. 2014-236238 filed on Nov. 21, 2014, including specification, drawings and claims is incorporated herein by reference in its entirety.

TECHNICAL FIELD

The present invention relates to a motorcycle frame structure, and more particularly, to the frame structure of an aluminum twin-spar frame.

BACKGROUND

In the related art, as a frame structure for suspending an engine for a motorcycle, there has been proposed a frame structure which is composed of hollow cast products so as to be so strong that it can support the weight of an engine while suppressing the weight of the motorcycle body frame (see Patent Document 1, for instance). In the frame structure disclosed in Patent Document 1, the motorcycle body frame is cast in aluminum, and in the casting process, in order to achieve a hollow structure, a sand core is set inside the mold.

Also, there has been proposed a frame structure in which the cross section of the frame is opened, for the purpose of reducing the weight of the motorcycle body frame and simplifying the mold (see Patent Document 2, for instance). In the frame structure disclosed in Patent Document 2, the cross section of the frame is opened. Therefore, it is possible to cast the corresponding frame structure without using any core.

Patent Document 1: Japanese Patent Application Publication No. 2007-144500A

Patent Document 2: Japanese Patent Application Publication No. 2003-170882A

According to the frame structure disclosed in Patent Document 2, it is possible to reduce the weight of the whole of the motorcycle body frame and simply the mold, resulting in a reduction in the cost. However, since the cross section of a portion of the motorcycle body frame is opened in a width direction of the motorcycle, there is a problem that the balance between strength and rigidity required for the motorcycle body frame of the vehicle is not achieved.

SUMMARY

It is an object of the present invention to provide a motorcycle frame structure capable of improving the efficiency of molding and excellent in the balance between strength and rigidity.

According to an aspect of the embodiments of the present invention, there is provided a motorcycle frame structure including a head frame which extends rearward from a head pipe, and tank rails which are welded to the head frame and extends rearward, wherein the head frame includes first bracket portions extending downward, wherein the tank rails include second bracket portions extending downward, wherein an engine is suspended by the first bracket portions and the second bracket portions, and wherein each of the first bracket portions includes a front wall portion extending in a width direction of a motorcycle, and a pair of side wall portions extending rearward from both ends of the front wall portion so as to form a first space opened to a rear side.

According to this configuration, since the engine is suspended by the first and second bracket portions, the head frame and the tank rails can support the weight of the engine in conjunction with each other. Also, since each first bracket portion is composed of a front wall portion and a pair of side wall portions, it is possible to optimize torsional rigidity and lateral rigidity while securing longitudinal rigidity, and it is possible to implement a frame structure excellent in the balance between the strength and rigidity of the motorcycle body frame. Further, since each first bracket portion has a space opened at a rear side thereof, when the head frame is molded, it is not required to use a core, and it is possible to simplify the molding process. As described above, it is possible to provide a motorcycle frame structure capable of improving the efficiency of molding and excellent in the balance between strength and rigidity.

In the motorcycle frame structure, the second bracket portions may have second spaces closed at outer sides thereof in the width direction and opened at inner sides thereof in the width direction. According to this configuration, since the motorcycle outer sides of the second bracket portions are closed, and the second spaces are formed on the inner sides of the second bracket portions, it is possible to accommodate components such as wiring lines inside the second spaces, and it is possible to prevent those components from being exposed to the outside. Also, since the second spaces are opened in the width direction, the lateral rigidity is reduced, and dimension absorptivity in the width direction in a case of suspending the engine is improved. As a result, loosing of bolts attributable to vibration or the like is prevented.

In the motorcycle frame structure, joint portions where the head frame and the tank rails are welded to each other may be provided at positions apart from base ends of the first bracket portions. According to this configuration, since the joint portions are apart from the first bracket portions, even if stress is concentrated on the base ends of the first bracket portions when the engine is suspended, it is possible to minimize the influence of suspending of the engine on the joint portions.

The motorcycle frame structure may further comprise body frames which are welded to the tank rails and extend rearward and downward, the head frame may include first frame portions extending rearward and having hollow cross section, the tank rails may include second frame portions extending rearward and having hollow cross section, the body frames may include swing arm pivots which support a swing arm in a swingable manner, and third frame portions which extend rearward and downward to the swing arm pivots and have hollow cross section, and the first frame portions, the second frame portions, and the third frame portions may be provided in a continuous manner. According to this configuration, since the hollow portions are provided such that they are continuous from the head frame to the body frames, it is possible to achieve a high-strength structure as an entire motorcycle frame.

According to the aspect of the embodiments of the present invention, the engine is suspended by the first and second bracket portions, and the first bracket portions are opened at rear sides thereof. Therefore, it is possible to provide a motorcycle frame structure capable of improving the efficiency of molding and excellent in the balance between strength and rigidity.

DETAILED DESCRIPTION OF THE EMBODIMENTS

In the related art, an aluminum twin-spar frame having a shape with a high curvature so as to hold a power unit and a fuel tank is cast in aluminum, and thus is rigid and light. In the aluminum casting process, in order to provide a hollow to the motorcycle body frame, a sand core is set inside the mold. In order to fix the core at a predetermined position, it is required to support the core with a plurality of pins. As a result, the molded motorcycle body frame has a plurality of through-holes attributable to the plurality of pins. For this reason, stress is concentrated on those through-holes, inherently high strength is not achieved.

Also, as for motorcycles, according to driving postures, cases where high rigidity is required and cases where high rigidity is not required can be considered. For example, during normal driving, high rigidity is required such that motorcycles can withstand vertical bending even if they are subjected to shocks from the roads. In this case, if longitudinal rigidity is improved, stability during normal driving is improved. Meanwhile, for example, during tight cornering, if the lateral rigidity of the frame of a motorcycle is excessively high, since the frame does not absorb shocks from the roads, the motorcycle body jumps up, and thus stability during driving is not necessarily good. As described above, a motorcycle body frame is not always good just because its rigidity is high. For this reason, it is becoming more important to balance longitudinal rigidity, lateral rigidity, torsional rigidity, and the like.

Figure 1:
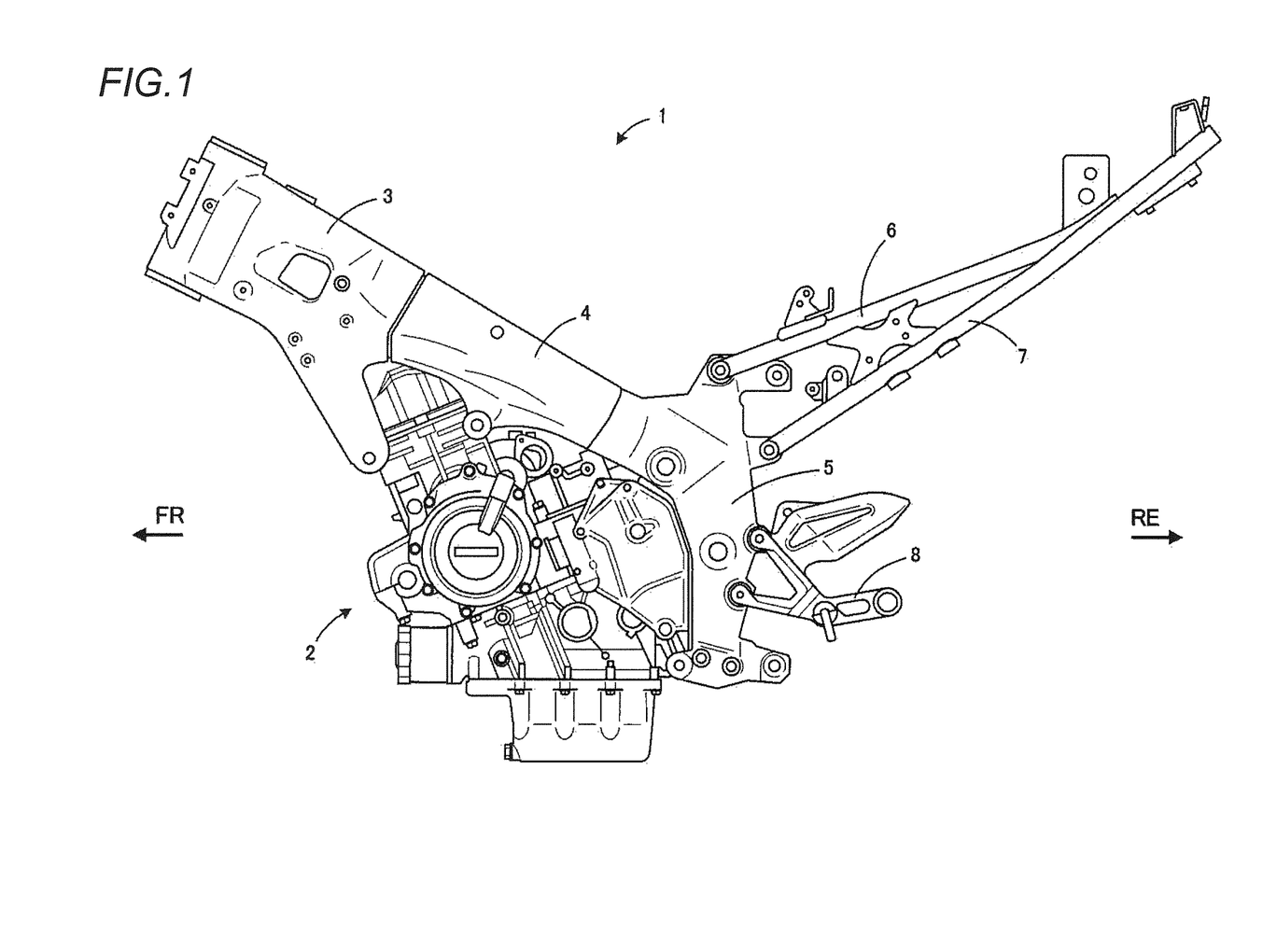
FIG. 1 is a side view illustrating an outline of a motorcycle body frame and an engine of a motorcycle, according to an embodiment of the present invention.

Therefore, as shown in FIG. 1, an engine 2 is suspended on a front portion and a rear portion (a head frame 3 and a pair of tank rails 4 to be described below) of a motorcycle body frame 1, whereby the degree of freedom in design is increased such that it is possible to secure a rigidity balance required for the whole of the motorcycle body frame 1. Also, bracket portions 33 (see FIG. 3) for suspending the front side of the engine 2 extend downward, and the rear sides of the bracket portions 33 are opened. As a result, it is possible to optimize the lateral rigidity value of the motorcycle body frame 1 while ensuring particularly the longitudinal rigidity value and the torsional rigidity value, and reduce the weight of the whole of the motorcycle body frame 1.

Hereinafter, an embodiment of the present invention will be described in detail with reference to the accompanying drawings. Also, hereinafter, an example obtained by applying a motorcycle frame structure according to the present invention to an aluminum twin-spar frame will be described. However, the present invention can be applied to other subjects and can be modified. Also, as for directions, the front, rear, left, and right of a motorcycle body are indicated by arrows FR, RE, L, and R, respectively. Also, in the drawings, for convenience of explanation, some components are not shown.

Figure 2:
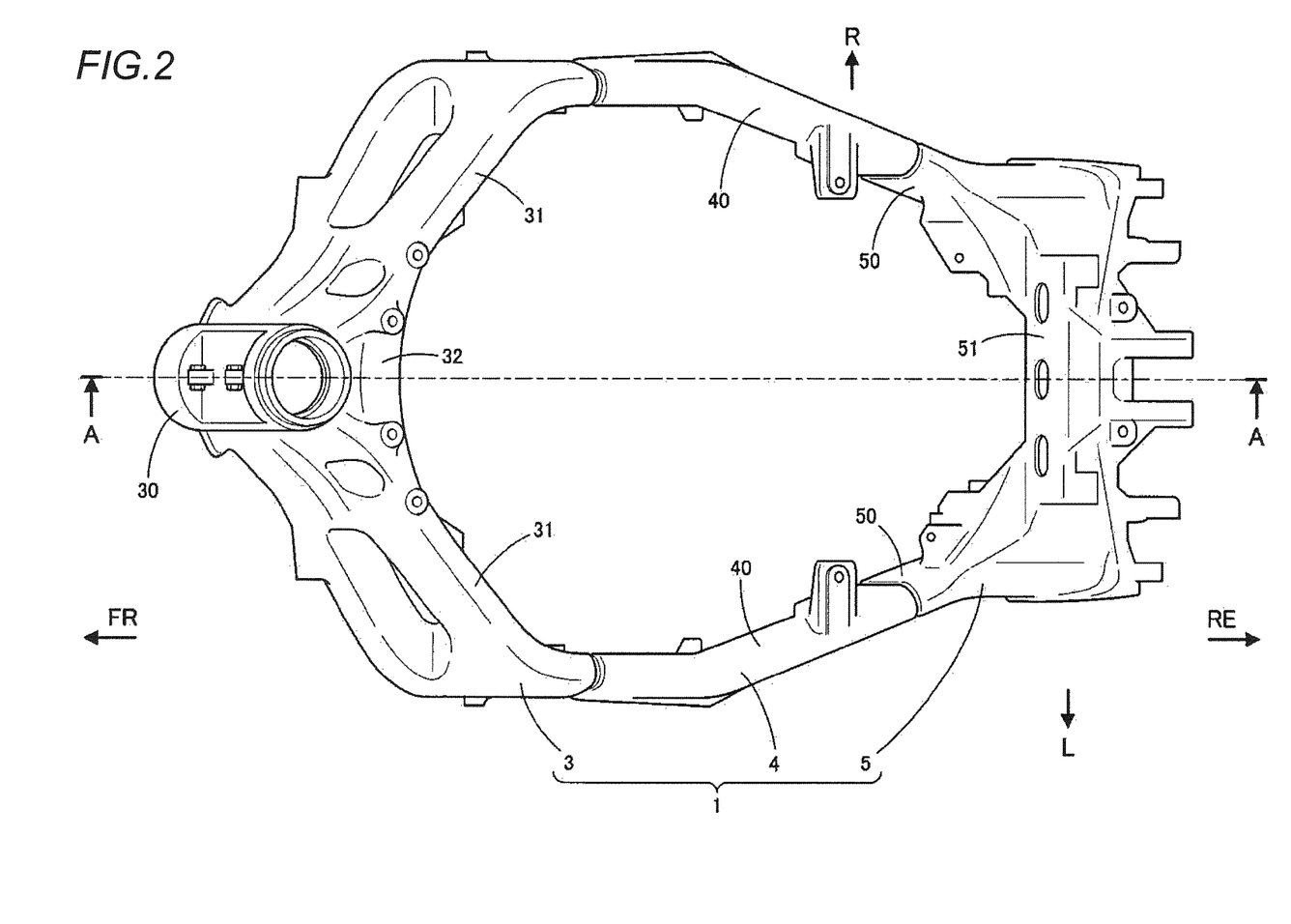
FIG. 2 is a top view illustrating the motorcycle body frame according to the embodiment.

With reference to FIGS. 1 and 2, an outline of a motorcycle body frame according to the present embodiment will be described. FIG. 1 is a side view illustrating the outline of the motorcycle body frame and the engine of the motorcycle according to the present embodiment. FIG. 2 is a top view illustrating the motorcycle body frame according to the present embodiment.

As shown in FIG. 1, the motorcycle body frame 1 according to the present embodiment is a twin-spar type frame which is cast in aluminum, and if the engine 1 is suspended on the motorcycle body frame, rigidity required for the whole of the motorcycle body is achieved. The engine 2 may be composed of a V-twin engine and a transmission, and is transversely suspended on the head frame 3, the tank rails 4, and a pair of body frames 5.

As shown in FIGS. 1 and 2, the motorcycle body frame 1 includes the head frame 3 extending in the front and rear (forward and rearward) direction of the motorcycle body, the pair of left and right tank rails 4 extending obliquely downward from the head frame 3 toward the rear side of the motorcycle body (rearward), and the pair of left and right body frames 5 extending downward from the rear end portions of the tank rails 4, respectively. The head frame 3 constitutes the front side of the motorcycle body frame 1, and includes a head pipe 30 which supports a front fork (not shown) such that it is possible to perform steering through a steering shaft (not shown).

The pair of tank rails 4 extend rearward from the rear end of the head frame 3. On the head frame 3 and the tank rails 4, the front portion of the engine 2 is suspended. Also, on the tank rails 4, a fuel tank (not shown) is disposed. From the rear end portions of the tank rails 4, the body frames 5 extend downward. On the body frames 5, the rear end portion of the engine 2 is suspended. Also, from the rear portions of the body frames 5, a seat rail 6 and a backstay 7 are provided so as to extend rearward and upward. On the seat rail 6, a seat (not shown) is provided and is connected to the fuel tank. Also, on the rear ends of the body frames 5, footrests 8 for a fellow passenger are provided.

Figure 3:
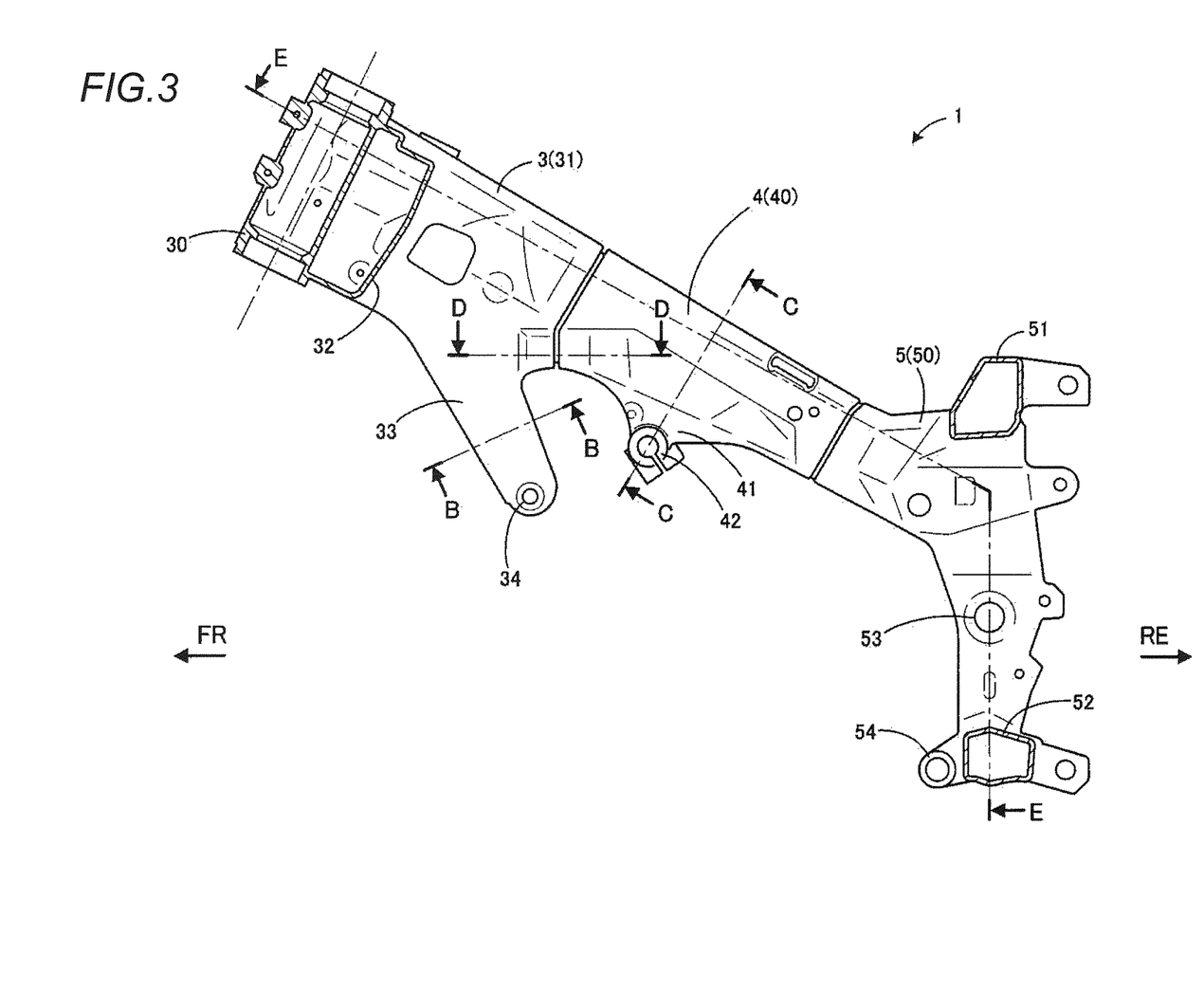
FIG. 3 is a cross-sectional view taken by cutting the motorcycle body frame of FIG. 2 along a line A-A.

Subsequently, the detailed configuration of the motorcycle body frame according to the present embodiment will be described with reference to FIGS. 2 and 3. FIG. 3 is a cross-sectional view taken by cutting the motorcycle body frame of FIG. 2 along a line A-A.

As shown in FIGS. 2 and 3, the head frame 3 includes the head pipe 30, a pair of frame portions 31 which extend rearward from the head pipe 30, and a connection portion 32 which connects the head pipe 30 and the pair of frame portions 31. The head pipe 30 is formed in a cylindrical shape extending vertically, the connection portion 32 is formed so as to widen in the right and left direction as it goes rearward. Also, especially, as shown in FIG. 3, the connection portion 32 has a hollow cross section. Also, the pair of frame portions 31 (first frame portions) each are formed substantially in a rectangular cylinder shape having a hollow cross section. The connection portion 32 and the pair of frame portions 31 are joined together such that their hollow cross sections are continuous. From the lower sides of the frame portions 31, the bracket portions 33 (first bracket portions) are formed so as to extend rearward and downward, and at the lower ends of the bracket portions 33, suspending portions 34 are provided for suspending the front side of the engine 2 (see FIG. 1). The head frame 3 which is configured as described above is integrally formed of an aluminum-based casting material or the like.

The tank rails 4 are formed of an aluminum-based casting material or the like, and include frame portions 40 (second frame portions) each having a substantially rectangular cylinder shape having a hollow cross section. On the frame portions 40, bracket portions 41 (second bracket portions) are formed so as to extend downward, and at the lower ends of the bracket portions 41, suspending portions 42 are provided for suspending the front side of the engine 2. The suspending portions 42 are formed at positions slightly higher than the suspending portions 34 of the head frame 3. In the present embodiment, the front side of the engine 2 is suspended by the suspending portions 34 of the head frame 3 and the suspending portions 42 of the tank rails 4.

The body frames 5 are formed of an aluminum-based casting material or the like, and include a pair of frame portions 50 (third frame portions) which extend downward from the rear ends of the pair of tank rails 4 and have hollow cross section. The upper ends of the pair of frame portions 50 are connected by an upper bridge 51 extending in the width direction of the motorcycle, and the lower ends of the pair of frame portions 50 are connected by a lower bridge 52 extending in the width direction. Also, at middle portions of the frame portions 50 in extension directions thereof, swing arm pivots 53 are formed so as to support a swing arm (not shown) in a swingable manner. Also, at the lower ends of the frame portions 50, bracket portions 54 are provided so as to support the rear side of the engine 2.

The head frame 3, the pair of tank rails 4, and the body frames 5 described above are integrated by welding the rear ends of the frame portions 31 and the front ends of the frame portions 40 and welding the rear ends of the frame portions 40 and the front ends of the frame portions 50, thereby constituting the motorcycle body frame 1. The joint portions of the frame portions 31 and the frame portions 40 will be described below. As described above, a space for accommodating the engine 2 is formed by the constituent members of the motorcycle body frame 1.

Figure 4:
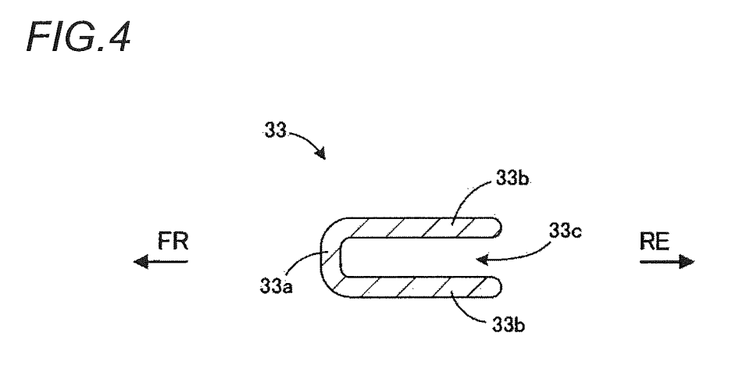
FIG. 4 is a cross-sectional view taken by cutting the motorcycle body frame of FIG. 3 along a line B-B.
Figure 5:
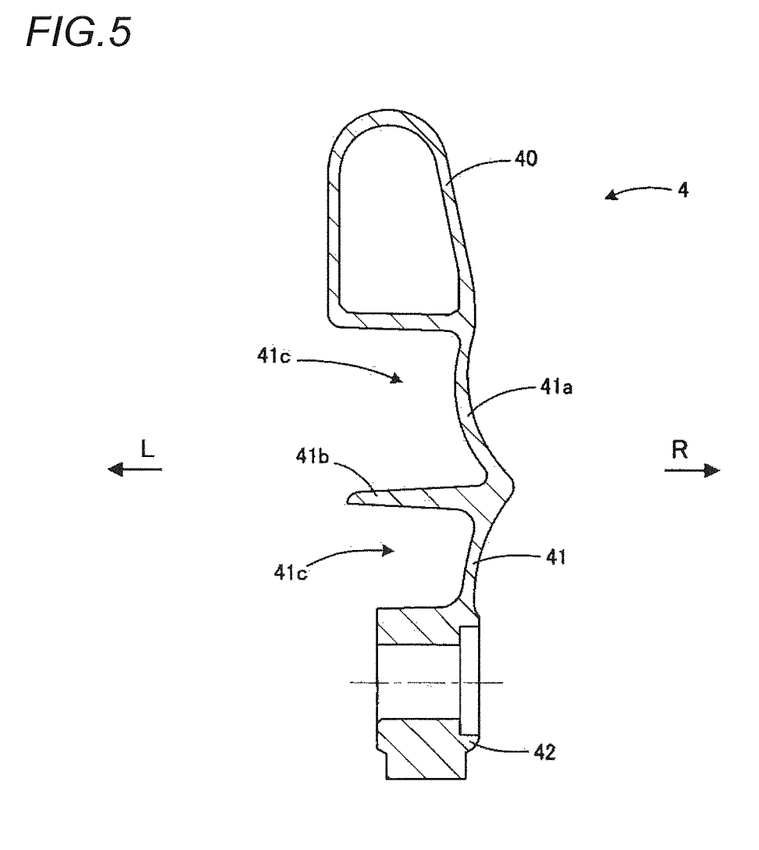
FIG. 5 is a cross-sectional view taken by cutting the motorcycle body frame of FIG. 3 along a line C-C.
Figure 6:
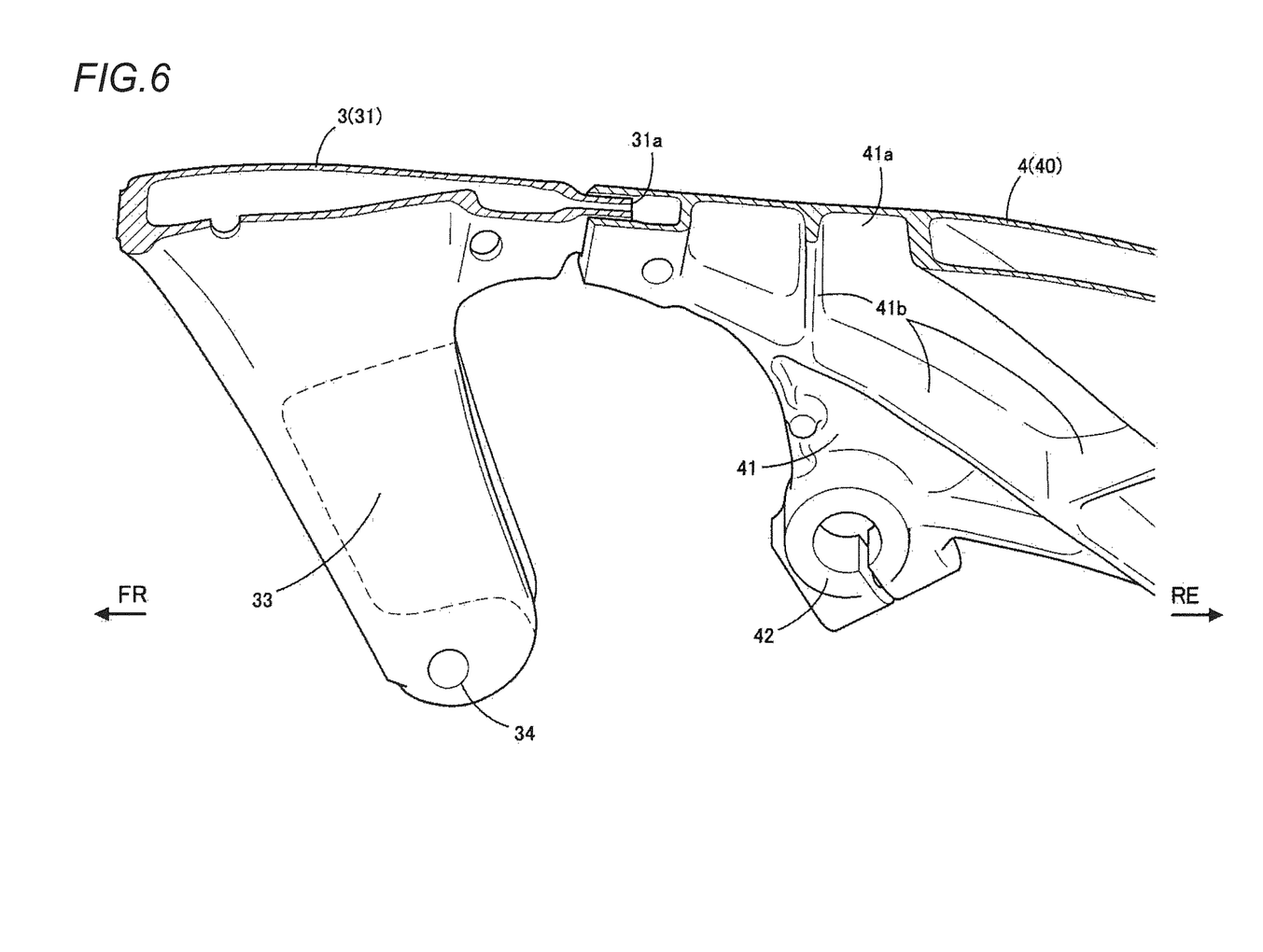
FIG. 6 is a cross-sectional view taken by cutting the motorcycle body frame of FIG. 3 along a line D-D.
Figure 7:
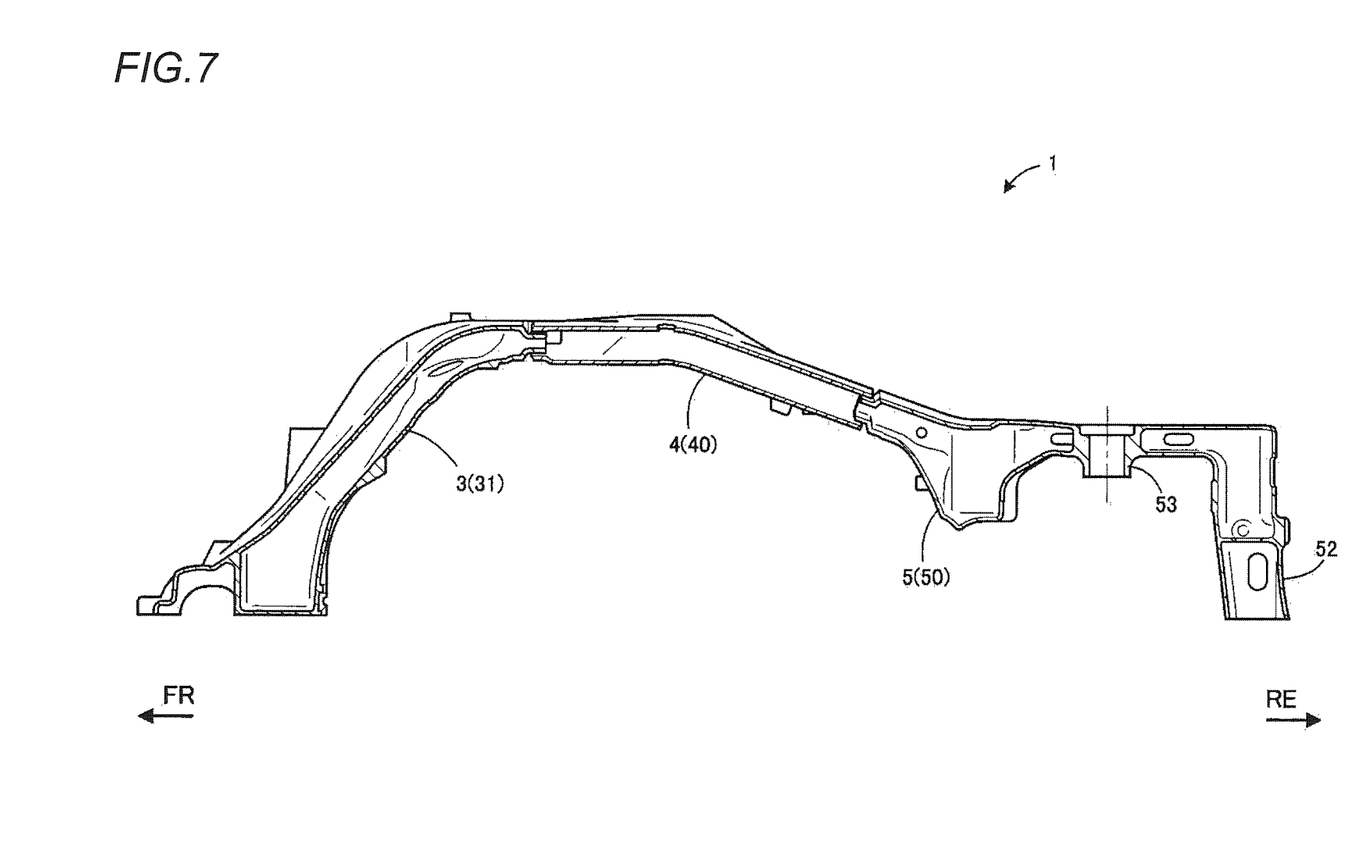
FIG. 7 is a cross-sectional view taken by cutting the motorcycle body frame of FIG. 3 along a line E-E.

Subsequently, the detailed configuration of each component of the motorcycle body frame will be described with reference to FIGS. 4 to 7. FIG. 4 is a cross-sectional view taken by cutting the motorcycle body frame of FIG. 3 along a line B-B. FIG. 5 is a cross-sectional view taken by cutting the motorcycle body frame of FIG. 3 along a line C-C. FIG. 6 is a cross-sectional view taken by cutting the motorcycle body frame of FIG. 3 along a line D-D. FIG. 7 is a cross-sectional view taken by cutting the motorcycle body frame of FIG. 3 along a line E-E.

As shown in FIG. 4, the bracket portions 33 which extend from the lower ends of the frame portions 31 are opened at rear sides thereof so as to have substantially U-shaped cross section. More specifically, each bracket portion 33 includes a front wall portion 33a which has a thickness in the front and rear direction of the motorcycle and extends in the width direction, and a pair of side wall portions 33b which extend rearward from both ends of the front wall portion 33a. The front wall portion 33a and the pair of side wall portions 33b form a space 33c which is opened at a rear side thereof. Therefore, even if tensile stress directed downward is applied to the bracket portions 33 when the engine 2 (see FIG. 1) is suspended, since the front wall portions 33a are provided and thus longitudinal rigidity is high, there is no problem in terms of strength.

Also, since the spaces 33c are formed so as to be opened at rear sides thereof, it is possible to reduce the weight of the head frame 3. Also, when the head frame 3 is cast in aluminum, it is not required to use a core. Therefore, it is possible to simplify the shape of the mold. For example, in a case of using a core, shrinkage cavities may be caused by gas generated from the core, or cracking may occur from pin holes of a completed motorcycle body frame. However, according to the present embodiment, since it is not required to provide pins for supporting a core and pin holes, it is possible to prevent shrinkage cavities and cracking. Also, the protrusion length of the bracket portions 33 can be appropriately changed, and it is possible to adjust longitudinal rigidity by changing the protrusion length. Also, inside the spaces 33c of the bracket portions 33, ribs may be provided so as to extend in the front and rear direction, thereby improving lateral rigidity. Even in this case, since the rear sides of the bracket portions 33 are opened, during molding, it is not required to use a core.

Also, as shown in FIG. 5, the frame portions 40 of the tank rails 4 have hollow cross section as described above. Further, from the lower sides of the frame portions 40, side wall portions 41a extend downward along the outer surfaces of the frame portions 40, and at the lower sides of the side wall portions 41a, the bracket portions 41 are formed. Furthermore, on the inner surface of each side wall portions 41a, a rib 41b (in FIG. 6, a plurality of ribs) is formed so as to rise toward the inner side in the width direction of the motorcycle. Spaces 41c whose outer sides in the width direction are closed by the side wall portions 41a and whose inner sides in the width direction are opened by the ribs 41b are formed. Inside the spaces 41c formed on the inner sides of the bracket portions 41 as described above, components such as a harness can be accommodated. Therefore, it is possible to prevent those components from being exposed to the outside, and thus the external appearance of the motorcycle body frame 1 is not impaired.

Also, since the inner sides of the bracket portions 41 in the width direction are opened, it is possible to simplify the shape of the mold as described above, and it is possible to reduce the weights of the tank rails 4. Further, since the inner sides in the width direction are opened, whereby the lateral rigidity of the tank rails 4 is reduced, the bracket portions 41 are likely to be deformed when the engine 2 is suspended. As a result, adhesion of the motorcycle body frame 1 and the engine 2 is improved. Also, since vibration of the engine can be absorbed by the bracket portions 41, it becomes difficult for bolts fixing the engine 2 to the motorcycle body frame 1 to loosen.

As shown in FIG. 6, the rear end of the head frame 3 (the frame portions 31) and the front ends of the tank rails 4 (the frame portions 40) are joined by welding. At the rear ends of the frame portions 31, beveling portions 31a are formed in cylindrical shapes one size smaller than the outer surface shapes of the tank rails 4. The beveling portions 31a are inserted into openings of the frame portions 40, whereby the head frame 3 is fit into the tank rails 4. At this time, between the base ends of the beveling portions 31a and the front ends of the frame portions 40, gaps are provided. The whole circumferences of the front ends of the frame portions 40 are welded to fill those gaps, whereby the head frame 3 and the tank rails 4 are joined. Also, the joint portions (more specifically, the base ends of the beveling portions 31a or the front end portions of the frame portions 40) of the head frame 3 and the tank rails 4 are provided on the rear side from the base end portions of the bracket portions 33 of the head frame 3 so as to be apart from those base end portions.

When the engine 2 (see FIG. 1) is suspended on the motorcycle body frame 1, stress is concentrated on the base end portions of the bracket portions 33. Therefore, it is possible to suppress the influence of suspending of the engine on the joint portions (the welded portions), without directly applying stress to the welded portions.

As shown in FIG. 7, the head frame 3, the tank rails 4, and the body frames 5 constituting the motorcycle body frame 1 are provided such that the frame portions 31, 40, and 50 having hollow cross section are continuous. As a result, in the front and rear direction of the motorcycle body frame 1, from the head pipe 30 to the swing arm pivots 53, a pair of continuous and rigid bodies are formed. Therefore, it is possible to achieve a high-strength structure as the entire motorcycle body frame 1.

As described above, according to the motorcycle body frame 1 of the present embodiment, since the engine 2 is suspended by the bracket portions 33 and 41, the head frame 3 and the tank rails 4 can support the weight of the engine 2 in conjunction with each other. Also, since each bracket portion 33 is composed of a front wall portion 33a and a pair of side wall portions 33b, it is possible to optimize torsional rigidity and lateral rigidity while securing longitudinal rigidity, and it is possible to implement a frame structure excellent in the balance between the strength and rigidity of the motorcycle body frame 1. Further, since each bracket portion 33 has a space 33c opened at a rear side thereof, when the head frame 3 is molded, it is not required to use a core, and it is possible to simplify the molding process. As described above, it is possible to provide a motorcycle frame structure capable of improving molding efficiency and excellent in the balance between strength and rigidity.

Also, since the outer sides of the tank rails 4 are closed, and the predetermined spaces 41c are formed on the inner sides of the tank rails, it is possible to accommodate components such as wiring lines inside the corresponding spaces 41c, and it is possible to prevent those components from being exposed to the outside. Also, since the spaces 41c are opened at the inner side thereof in the width direction, the lateral rigidity is reduced, and dimension absorptivity in the width direction in a case of suspending the engine 2 is improved. As a result, loosing of bolts attributable to vibration or the like is prevented. Also, since the joint portions are apart from the bracket portions 33, even if stress is concentrated on the base ends of the bracket portions 33 when the engine 2 is suspended, it is possible to minimize the influence of suspending of the engine 2 on the joint portions.

Also, the present invention is not limited to the embodiment mentioned above and can be modified and implemented in various forms. With respect to the sizes, shapes, and the like of the embodiment shown in the accompanying drawings, the present invention is not limited thereto and can be appropriately modified as long as the modifications exhibit the effects of the present invention. In addition, the invention can be appropriately modified and implemented without departing from the scope of the object of the invention.

For example, in the above described embodiment, the tank rails 4 have the spaces 41c opened at the inner side thereof in the width direction. However, the present invention is not limited thereto. The tank rails 4 may not have the spaces 41c.

Also, in the above described embodiment, the base ends of the bracket portions 33 are provided at positions apart from the joint portions of the head frame 3 and the tank rails 4. However, the present invention is not limited thereto. The bracket portions 33 may be provided so as to be close to the joint portions.

As described above, the present invention has the effect that it is possible to provide a motorcycle frame structure capable of improving molding efficiency and excellent in the balance between strength and rigidity, and is useful particularly in the frame structures of aluminum twin-spar frames.

What is claimed is:

1. A motorcycle frame structure including a head frame which extends rearward from a head pipe, and tank rails which are welded to the head frame and extends rearward,
    wherein the head frame includes first bracket portions extending downward,
    wherein the tank rails include second bracket portions extending downward,
    wherein an engine is suspended by the first bracket portions and the second bracket portions, and
    wherein each of the first bracket portions includes a front wall portion extending in a width direction of a motorcycle, and a pair of side wall portions extending rearward from both ends of the front wall portion so as to form a first space opened to a rear side.

2. The motorcycle frame structure according to claim 1, wherein the second bracket portions have second spaces closed at outer sides thereof in the width direction and opened at inner sides thereof in the width direction.

3. The motorcycle frame structure according to claim 1, wherein joint portions where the head frame and the tank rails are welded to each other are provided at positions apart from base ends of the first bracket portions.

4. The motorcycle frame structure according to claim 1, further comprising body frames which are welded to the tank rails and extend rearward and downward,
    wherein the head frame includes first frame portions extending rearward and having hollow cross section,
    wherein the tank rails include second frame portions extending rearward and having hollow cross section,
    wherein the body frames include swing arm pivots which support a swing arm in a swingable manner, and third frame portions which extend rearward and downward to the swing arm pivots and have hollow cross section, and
    wherein the first frame portions, the second frame portions, and the third frame portions are provided in a continuous manner.

* * * * *